(12) United States Patent
Dalsgaard et al.

(10) Patent No.: US 11,418,986 B2
(45) Date of Patent: Aug. 16, 2022

(54) MBSFN MEASUREMENT CONFIGURATION AND REPORTING

(71) Applicant: Nokia Technologies Oy, Espoo (FI)

(72) Inventors: Lars Dalsgaard, Oulu (FI); Ilkka Antero Keskitalo, Oulu (FI); Jorma Johannes Kaikkonen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 493 days.

(21) Appl. No.: 15/308,688

(22) PCT Filed: May 9, 2014

(86) PCT No.: PCT/US2014/037588
§ 371 (c)(1),
(2) Date: Nov. 3, 2016

(87) PCT Pub. No.: WO2015/171166
PCT Pub. Date: Nov. 12, 2015

(65) Prior Publication Data
US 2017/0195906 A1 Jul. 6, 2017

(51) Int. Cl.
*H04W 24/10* (2009.01)
*H04W 24/08* (2009.01)
*H04L 1/20* (2006.01)

(52) U.S. Cl.
CPC ............... *H04W 24/10* (2013.01); *H04L 1/20* (2013.01); *H04W 24/08* (2013.01)

(58) Field of Classification Search
CPC .......... H04W 24/10; H04W 24/08; H04L 1/20
(Continued)

(56) References Cited

U.S. PATENT DOCUMENTS

| 7,593,746 B2 | 9/2009 | Willenegger et al. |
| 7,974,179 B2 | 7/2011 | Morimoto et al. |

(Continued)

FOREIGN PATENT DOCUMENTS

| EP | 2528270 A1 | 11/2012 |
| EP | 2624614 A1 | 8/2013 |

(Continued)

OTHER PUBLICATIONS

Office action received for corresponding Russian Patent Application No. 2016144663, dated Jan. 23, 2018, 10 pages of office action and 3 pages of office action translation available.

(Continued)

*Primary Examiner* — Gbemileke J Onamuti
(74) *Attorney, Agent, or Firm* — Mintz Levin Cohn Ferris Glovsky and Popeo, P.C.

(57) ABSTRACT

Methods and apparatus, including computer program products, are provided for MBSFN measurements. In one aspect there is provided a method. The method may include receiving, by a user equipment, measurement configuration information indicative of one or more first measurements to be performed on a first set of subframes and one or more second measurements to be performed on a second set of subframes, wherein the first set of subframes are associated with multicast broadcast mobile services and the second set of subframes are associated with non-multicast broadcast mobile services; and performing one or more measurements in accordance with the received measurement configuration information; and reporting one or more first measurement results for the one or more first measurements supplemented with one or more second measurement results for the one or more second measurements. Related apparatus, systems, methods, and articles are also described.

23 Claims, 4 Drawing Sheets

(58) Field of Classification Search
USPC .......................................................... 370/252
See application file for complete search history.

(56) References Cited

U.S. PATENT DOCUMENTS

| | | | |
|---|---|---|---|
| 8,467,720 B2 | 6/2013 | Wu | |
| 8,730,986 B2 | 5/2014 | Wang et al. | |
| 9,374,148 B2 | 6/2016 | Chen et al. | |
| 2011/0116437 A1* | 5/2011 | Chen | H04B 7/0689 370/312 |
| 2012/0140778 A1* | 6/2012 | Wang | H04W 72/005 370/475 |
| 2013/0003578 A1* | 1/2013 | Hu | H04W 24/00 370/252 |
| 2013/0010624 A1 | 1/2013 | He et al. | |
| 2014/0064133 A1 | 3/2014 | Kazmi et al. | |
| 2014/0086095 A1 | 3/2014 | Jung et al. | |

FOREIGN PATENT DOCUMENTS

| | | |
|---|---|---|
| RU | 2427082 C2 | 8/2011 |
| WO | 2012/052398 A1 | 4/2012 |
| WO | WO-2012052398 A1 | 4/2012 |
| WO | 2012/059139 A1 | 5/2012 |
| WO | 2012064265 A1 | 5/2012 |
| WO | 2012/150894 A1 | 11/2012 |
| WO | 2013/023558 A1 | 2/2013 |
| WO | 2013/028119 A1 | 2/2013 |
| WO | 2013/066679 A1 | 5/2013 |
| WO | 2013/148347 A1 | 10/2013 |
| WO | 2013/167192 A1 | 11/2013 |

OTHER PUBLICATIONS

"3rd Generation Partnership Project; Technical Specification Group Radio Access Network; Evolved Universal Terrestrial Radio Access (E-UTRA); Requirements for support of radio resource management (Release 12)", 3GPP TS 36.133, V12.2.0, Mar. 2013, pp. 1-815.

"3rd Generation Partnership Project; Technical Specification Group Radio Access Network; Universal Terrestrial Radio Access (UTRA) and Evolved Universal Terrestrial Radio Access (EUTRA); Radio measurement collection for Minimization of Drive Tests (MDT); Overall description; Stage 2 (Release 11)", 3GPP TS 37.320, V11.3.0, Mar. 2013, pp. 1-23.

Alexiou et al., "Spectral Efficiency Performance of MBSFN-enabled LTE Networks", International Conference on Wireless and Mobile Computing, Networking and Communications, 2010, pp. 361-367.

"3rd Generation Partnership Project; Technical Specification Group Radio Access Network; Evolved Universal Terrestrial Radio Access (E-UTRA); LTE physical layer; General description(Release 11)", 3GPP TS 36.201, V11.1.0, Dec. 2012, pp. 1-13.

"3rd Generation Partnership Project; Technical Specification Group Radio Access Network; Evolved Universal Terrestrial Radio Access (E-UTRA); Physical channels and modulation (Release 12)", 3GPP TS 36.211, V12.1.0, Mar. 2014, pp. 1-120.

"3rd Generation Partnership Project; Technical Specification Group Radio Access Network; Evolved Universal Terrestrial Radio Access (E-UTRA); Multiplexing and channel coding (Release 12)", 3GPP TS 36.212, V12.0.0, Dec. 2013, pp. 1-88.

"3rd Generation Partnership Project; Technical Specification Group Radio Access Network; Evolved Universal Terrestrial Radio Access (E-UTRA); Physical layer procedures (Release 12)", 3GPP TS 36.213, V12.1.0, Mar. 2014, pp. 1-186.

"3rd Generation Partnership Project; Technical Specification Group Radio Access Network; Evolved Universal Terrestrial Radio Access (E-UTRA); Physical layer; Measurements (Release 11)", 3GPP TS 36.214, V11.1.0, Dec. 2012, pp. 1-14.

Tentative Rejection received for corresponding Taiwan Patent Application No. 104114737, dated Jul. 21, 2016, 10 pages of Tentative Rejection and 4 pages of translation available.

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331, V12.3.0, Sep. 2014, pp. 1-378.

Tentative Rejection received for corresponding Taiwan Patent Application No. 104114737, dated May 10, 2017, 10 pages of Tentative Rejection and 3 pages of translation available.

Office action received for corresponding Canadian Patent Application No. 2947953, dated Aug. 1, 2017, 4 pages.

Office Action received for corresponding Korean Patent Application No. 2016-7034398, dated Aug. 21, 2017, 7 pages of office action and no page of office action translation available.

"Stage 2 Issues for Further MBMS Operations Support", 3GPP TSG-RAN Working Group 2 meeting #85, R2-140137, Agenda: 7.3, Catt, Feb. 10-14, 2014, pp. 1-6.

Office action received for corresponding Japanese Patent Application No. 2016-566902, dated Feb. 5, 2018, 4 pages of office action and 4 pages of office action translation available.

"MBSFN Measurement for MDT", 3GPP TSG-RAN WG2#85bis, R2-141231, Agenda Item: 7.3, Qualcomm Incorporated, Mar. 31-Apr. 4, 2014, 25 pages.

"Consideration of the MDT Measurement at RRC_IDLE State", 3GPP TSG-RAN WG4 (Radio) Meeting Ad Hoc 4 2010, R4-103765, Agenda Item: 9.10.1, Research in Motion UK Limited, Nov. 11-15, 2010, 2 pages.

Office Action received for corresponding Taiwan Patent Application No. 104114737, dated Jan. 2, 2018, 5 pages of Office Action and 3 pages of translation available.

International Search Report and Written Opinion received for corresponding Patent Cooperation Treaty Application No. PCT/US2014/037588, dated May 9, 2014, 11 pages.

Office action received for corresponding Canadian Patent Application No. 2947953, dated Jun. 26, 2018, 4 pages.

Office action received for corresponding Japanese Patent Application No. 2016-566902, dated May 21, 2018, 6 pages of office action and 5 pages of translation available.

Final Office Action received for corresponding Korean Patent Application No. 2016-7034398, dated Apr. 9, 2018, 4 pages of office action and no page of translation available.

* cited by examiner

MBSFN MEASUREMENT CONFIGURATION AND REPORTING

RELATED APPLICATION

This application was originally filed as Patent Cooperation Treaty Application No. PCT/US2014/037588 filed May 9, 2014.

FIELD

The subject matter described herein relates to wireless communications.

BACKGROUND

Multimedia Broadcast Multicast Services (MBMS) relates to a multicasting services broadcast by one or more cellular base stations. For example, a cellular network may provide an application, such as mobile television as well as any other application, to one or more user equipment using for example a multicast broadcast single-frequency network (MBSFN) in which base stations transmit on the same frequency in a coordinated way to provide for example the mobile television broadcast as well as any other application.

SUMMARY

Methods and apparatus, including computer program products, are provided for MBSFN measurements.

In some example embodiments, there is provided a method. The method may include receiving, by a user equipment, measurement configuration information indicative of one or more first measurements to be performed on a first set of subframes and one or more second measurements to be performed on a second set of subframes, wherein the first set of subframes are associated with multicast broadcast mobile services and the second set of subframes are associated with non-multicast broadcast mobile services; performing one or more measurements in accordance with the received measurement configuration information; and reporting one or more first measurement results for the one or more first measurements supplemented with one or more second measurement results for the one or more second measurements.

In some variations, one or more of the features disclosed herein including the following features can optionally be included in any feasible combination. The one or more first measurement results may be non-continuous. One or more gaps in the one or more first measurement results may be filled with the one or more second measurement results. The one or more first measurement results may be reported along with the one or more second measurement results. The one or more first measurements may be performed on multicast broadcast mobile services subframes. The one or more first measurement may be performed from the reference signal of the multicast broadcast mobile services subframes. The one or more second measurements may be performed for radio resource management purposes. The one or more second measurements may include at least one of a connected state mobility measurement or an idle state mobility measurement. The one or more second measurements may be performed from a common reference signal. The one or more measurements may be performed in an idle state or a connected state. The one or more second measurement results may include results for multiple cells. A cell result may be associated with a cell identification. The one or more second measurement results may be reported for cells on a same frequency as a multicast broadcast single frequency network carrier frequency. The one or more second measurement results may be reported for cells on a different frequency as a multicast broadcast single frequency network carrier frequency. The one or more first measurement results may include at least one of a reference signal received power measurement, a reference signal received quality measurement, a received signal strength indicator measurement, or a block error rate measurement. The one or more second measurements may include at least one of a reference signal received power measurement, a reference signal received quality, or a received signal strength indicator measurement.

In some other example embodiments, there is provided a method. The method may include sending, by a network node, measurement configuration information indicative of one or more first measurements to be performed on a first set of subframes and one or more second measurements to be performed on a second set of subframes, wherein the first set of subframes are associated with multicast broadcast mobile services and the second set of subframes are associated with non-multicast broadcast mobile services; and receiving, in response to the measurement configuration information, one or more reports including one or more first measurement results for the one or more first measurements supplemented with one or more second measurement results for the one or more second measurements.

In some variations, one or more of the features disclosed herein including the following features can optionally be included in any feasible combination. The one or more first measurement results may be reported along with the one or more second measurement results. The one or more first measurements may be performed on multicast broadcast mobile services subframes. The one or more second measurements may be performed for radio resource management purposes. The method may further include adjusting, based on received one or more reports, at least a modulation and coding scheme for a multicast broadcast single frequency network.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
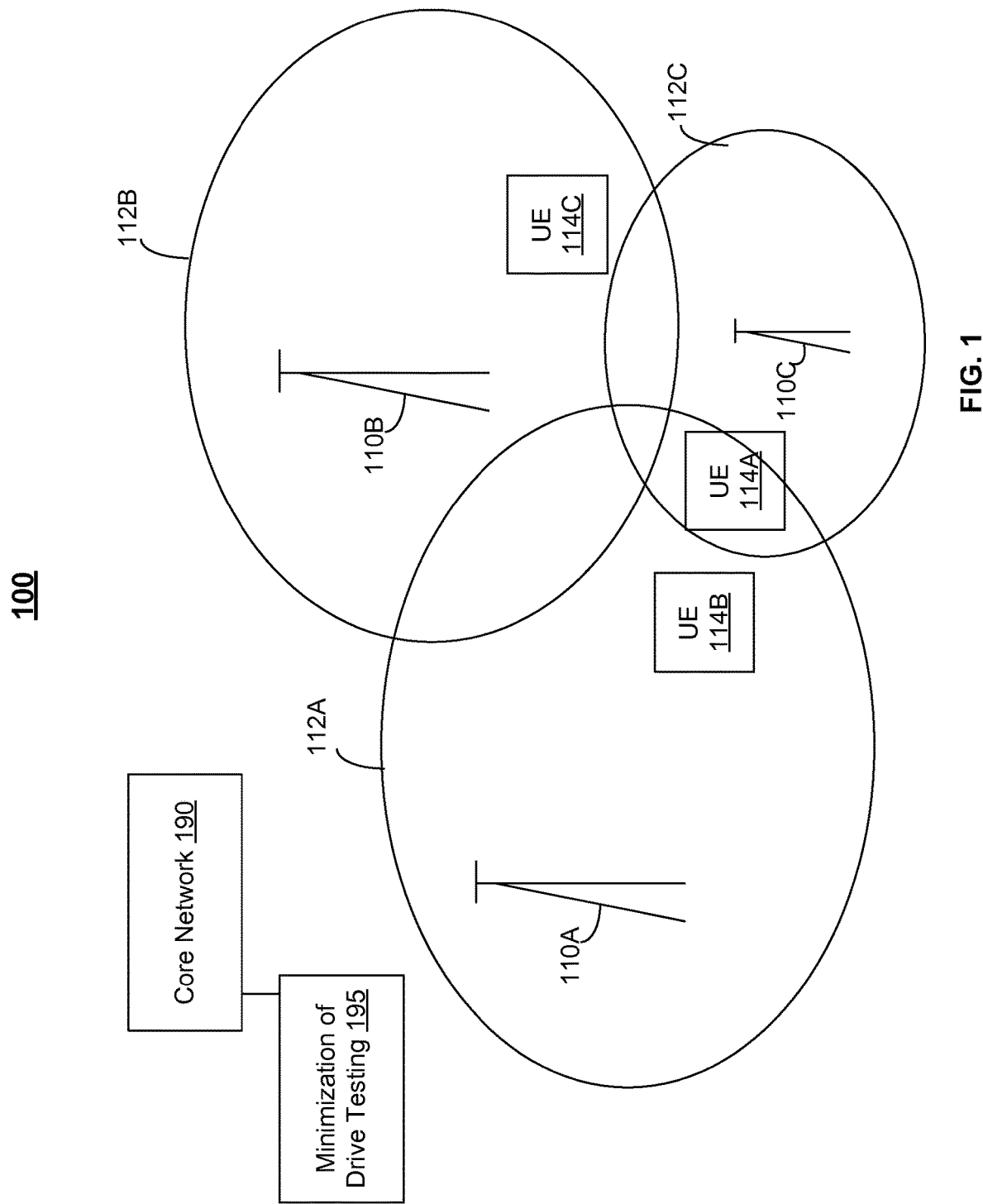
FIG. 1 depict an example of a system configured for multicast broadcast single-frequency network (MBSFN) measurements including measurements on non-MBSFN subframes and MBSFN subframes, in accordance with some exemplary embodiments.

Like labels are used to refer to same or similar items in the drawings.

DETAILED DESCRIPTION

In Multimedia Broadcast Multicast Services (MBMS), one or more user equipment may be configured to perform measurements of the multicast broadcast single-frequency network (MBSFN), and report those measurements to a network. The types of measurements, reporting, and other aspects may be configured by the network and/or specified by a standard. For example, a UE may perform MBSFN measurements associated with a certain geographical location covered by the MBMS. Moreover, the MBSFN measurements may support verification of MBSFN signal reception, support planning and reconfiguration (for example, of MBSFN areas and/or MBMS operational parameters), and/or support MBSFN radio reception measurement(s) to be collected utilizing, for example, a Minimization of Drive Test (MDT) functionality.

The MBSFN may be configured based on, as noted, a standard and/or configuration information signaled or broadcast by a network. For example, MBSFN measurements may include reference signal received power (RSRP) and reference signal received quality (RSRQ) determinations per a given MBSFN coverage area. Moreover, these measurements may be based on a received signal strength indicator (RSSI) measurements averaged over for example only those orthogonal frequency division multiplexing (OFDM) symbols in subframes carrying MBSFN reference signals (RS). Moreover, the measurements may include a multicast channel (MCH) block error rate (BLER) measurement per MBSFN MCS (modulation and coding scheme) and/or per MBSFN area. Moreover, these measurements may be done only in subframes and carriers where the UE is decoding a physical multicast channel (PMCH). In addition, the network may provide a measurement configuration (including a reporting configuration), and this configuration may be provided by a MDT (Minimization of Drive Tests) functionality. When this is the case, MBSFN measurements may be initiated by the operation, administration and maintenance (OAM) functionality of a network, where a Trace function activates the MBSFN measurements and collects reported data. When a UE is configured with the MBSFN measurements, the UE may also perform MBSFN measurements according to certain given performance requirements, examples of which are described in 3GPP TS 36.133, Evolved Universal Terrestrial Radio Access (E-UTRA); Requirements for support of radio resource management, Release 12. Furthermore, the UE may be configured to perform MBSFN measurements during MBMS service reception and, in particular, during, for example, a radio resource control (RRC) connected and/or idle modes. Moreover, in the case of MDT, two MBSFN measurement modes may be configured/specified separately for RRC connected mode and Idle mode.

Although a primary use for MBSFN measurements is verification of the MBSFN coverage and achievement of a certain service quality, a mobile network operator may use UE reported MBSFN measurements to also enable adjustments/modifications to an MBSFN deployment (for example, adjustments to cell coverage areas for the MBSFN), adjustments/modifications to an MBSFN MCS (which may be configured in a semi-static manner but may be may be changed to match with the desired coverage and targeted service quality), and/or for other reasons and/or adjustments as well. These parameters may be adjusted for example per MBSFN area. And, these adjustments may be facilitated by the MBSFN measurement information reported by one or more UE.

However, the scheduling of MBMS may be highly irregular. For example if MBSFN measurements use only the MBMS reference symbols (RS) available in the MBMS sub-frames (which includes relevant information for the MBMS service reception the UE is interested in) being decoded by the UE, both the multicast control channel (MCCH) and multicast transport channel (MTCH) decoding may be time varying, or irregular, based on the MBMS reception status and scheduling of MBMS data. Indeed, MBMS services may vary between a fairly constant streaming data flow to an intermittent data flow, such as a speech service in for example group communications using MBMS multicasting, which can be intermittent and without a regular traffic pattern. These irregularities may result in an unpredictable reporting of measurements and thus relevant measurement information may be lost even though the measurements have been activated and collected at the UE and the UE is able to reporting the MBSFN measurement results (but for the varying/irregular MBMS connectivity).

Some MBSFN measurement reporting may be based solely on measurements from MBMS subframes. The MBSFN reporting information may, however, have limited information with respect to potential problems in an MBSFN deployment as noted above with respect to the irregularity of some MBMS services for example. As such, MBSFN measurement results over only MBSFN subframes may not reveal a root cause for a potential interference signal seen on MBMS subframes. To illustrate further, limited MBSFN measurements over only MBSFN subframes may lead to scenarios in which it would be difficult to determine if relevant cells are missing from an MBSFN group and thus what missing cell(s) should be added to the group.

In some example embodiments, MBSFN measurements may be performed on one or more MBMS subframes (for example, a measurement on one or more reference symbols, RS, of one or more MBMS subframes) and on one or more non-MBMS subframes. For example, a UE may perform measurements on one or more reference symbols, RS, included in one or more MBMS subframes, and perform radio resource management measurements on common reference signal, CRS of a non-MBMS subframe or cell. Both measurement types may be reported to the network (for example, a base station, a network management system, and/or a MDT functionality) to enable the network to control and otherwise manage MBMS.

In some example embodiments, a UE may report to the network MBSFN measurements performed on the MBMS subframes and on non-MBMS subframes with configured intervals and/or with configured pre-processing (filtering). If the UE is in idle mode, the UE may log measurements from both the MBMS subframes and non-MBMS subframes and report those measurement results. Moreover, the UE may, in some example embodiments, process both types of MBSFN measurement results (i.e., measurement results for both MBMS subframes and non-MBMS subframes), and these results may be reported to the network in accordance with a MBSFN measurement and/or reporting configuration. Moreover, the UE may report other cell measurement results that are collected by the UE in accordance with a configuration received along with the MBSFN measurement configuration.

In some example embodiments, a UE may perform non-MBMS measurements of a subframe or a cell (for example, a cell's CRS), when there is no data to be decoded on one or more MBMS subframes, regardless of the duration of the interruption of MBSFN decoding.

In some example embodiments, non-MBMS cell measurements may be performed on a carrier where the measured MBSFN is transmitted, although inter-frequency measurements may (or may not be performed as well).

In some example embodiments, non-MBMS cell measurement results may be associated with corresponding cell identifiers (IDs) to be able to distinguish the transmitted signals from different cells.

The UE reported measurement results may, as noted, include non-MBMS subframes/cell measurements to enable the network to fill-in potential measurement reporting gaps caused by the irregularity of some MBSFN measurement results, and, as such, enable the network to determine or estimate the performance of the MBMS. Moreover, the measurement results may include additional information, so that the network can collect relevant information from some (if not all) activated MDT measurements regardless of the nature of the MBMS service, which may not be known by the network node initiating the MDT measurements.

In some example embodiments, the UE may perform MBSFN measurements and report for example RSRP (or RSRQ) as an absolute value or a relative value when measuring non-MBSFN subframes/cells. In the case of an absolute value, the result may be reported to the network in terms of Decibel-milliwatts (dBm), although other types of values may be reported. In the case of a relative value, the RSRP (or RSRQ) may be reported relative to another signal, such as a neighboring cell (for example, a stronger cell) or relative to a measured RSRP of an MBMS subframe (which may include signals from multiple cells).

The UE's configuration for MBSFN measurement and/or reporting may be performed in a variety of ways. For example, the network may provide to a UE measurement and/or reporting configuration information for both non-MBMS cell/subframes and MBSFN subframes. Furthermore, this MBSFN measurement configuration may be configured as a common RRCConnectionReconfiguration message, which indicates a type of measurement object defining the measurements to be made, a measurement quantity, and/or a measurement/reporting configuration. The MBSFN measurement configuration may, in some example embodiments, further include filtering information, such as layer three filtering, or pre-processing, of parameters used for radio resource management (RRM) measurements.

However, the network may, in some example embodiments, provide to a UE measurement and/or reporting configuration information for non-MBMS cell/subframes and MBSFN subframes in separate messages. Moreover, this separate message for the non-MBMS cell/subframes may be sent only when so desired by the network. Moreover, this separate message may also be structured as, for example, an RRCConnectionReconfiguration message, although other forms may be used as well.

In some example embodiments, the measurement configuration information may indicate the periodicity of the cell measurements. The measurement interval may or may not be related to assumed MBSFN measurement configuration/periodicity. Moreover, cell measurement processing may have a fixed or standard configuration, although related parameters may be provided as well via for example broadcast information.

Moreover, the configuration for cell measurements may be done either as dedicated signaling during RRC connected mode, multicast signaling using for example MCCH, broadcast signaling on one or more system information blocks (SIBs). Alternatively or additionally, the cell measurement configuration (or portions thereof) may be fixed and/or specified in one or more standards. For example, the measurement configuration for RRM measurements used as part of the normal measurement configuration for mobility control may be extended for use to signal the measurement and/or reporting configuration of the non-MBMS cell/subframes.

Before providing additional examples related MBSFN measurements, the following provides a description of an example of a system, in accordance with some example embodiments.

FIG. 1 depicts a system 100 including a core network 190 and a minimization of drive testing function/node, both of which may be coupled via one or more backhaul links/networks to a plurality of base stations, such as base stations 110A-C serving cells 112A-C, and corresponding user equipment 114A-C. Although FIG. 1 depicts a certain quantity and configuration of devices, other quantities and configurations may be implemented as well. For example, other quantities and configurations of base stations/access points, cells, and user equipment may be implemented as well.

In some example embodiments, user equipment, such as 114A-C, may be implemented as a mobile device and/or a stationary device. The user equipment may be referred to as, for example, a wireless device, a mobile station, a mobile unit, a subscriber station, a wireless terminal, a tablet, a smart phone, and/or the like. In some example embodiments, user equipment 114 may be implemented as multi-mode user devices configured to operate using a plurality of radio access technologies, although a single-mode device may be used as well. For example, user equipment may be configured to operate using a plurality of radio access technologies including one or more of the following: Long Term Evolution (LTE), wireless local area network (WLAN) technology, such as 802.11 WiFi and the like, Bluetooth, Bluetooth low energy (BT-LE), near field communications (NFC), and any other radio access technologies. The user equipment may be located within the coverage area of a cell or multiple cells. The user equipment may also be configured to support point-to-point links to a base station and MBSFN (via for example a multicast or broadcast from one or more base stations).

The base stations, such as base stations 110A-C may, in some example embodiments, be configured as an evolved Node B (eNB) type base station, although other types of base stations and wireless access points may be used as well. In the case of eNB type base station, the base station may be configured in accordance with standards, including the Long Term Evolution (LTE) standards, such as 3GPP TS 36.201, Evolved Universal Terrestrial Radio Access (E-UTRA); Long Term Evolution (LTE) physical layer; General description, 3GPP TS 36.211, Evolved Universal Terrestrial Radio Access (E-UTRA); Physical channels and modulation, 3GPP TS 36.212, Evolved Universal Terrestrial Radio Access (E-UTRA); Multiplexing and channel coding, 3GPP TS 36.213, Evolved Universal Terrestrial Radio Access (E-UTRA); Physical layer procedures, 3GPP TS 36.214, Evolved Universal Terrestrial Radio Access (E-UTRA); Physical layer-Measurements, and any subsequent additions or revisions to these and other 3GPP series of standards (collectively referred to as LTE standards). The base stations may also be configured to serve cells using a WLAN technology, such as WiFi (for example, the IEEE 802.11 series of standards), as well as any other radio access technology capable of serving a cell. In the example of FIG. 1, base station/access point 110C may be configured to serve small cell using WiFi, although any other radio access technology may be used as well. The base stations may have wired and/or wireless backhaul links to other networks and/or network nodes including core network 190. Although some of the examples described herein refer to E-UTRAN, other types of networks, such as UTRAN (UMTS Terrestrial Radio Access Network), GERAN (GSM EDGE Radio Access network), WCDMA (Wideband Code Division Multiple Access), HSPA (High Speed Packet Access), and/or any other type of radio network. Moreover, the base stations may be configured to support MBMS and, as such, a MBSFN to one or more user equipment 114A-C.

Figure 2:
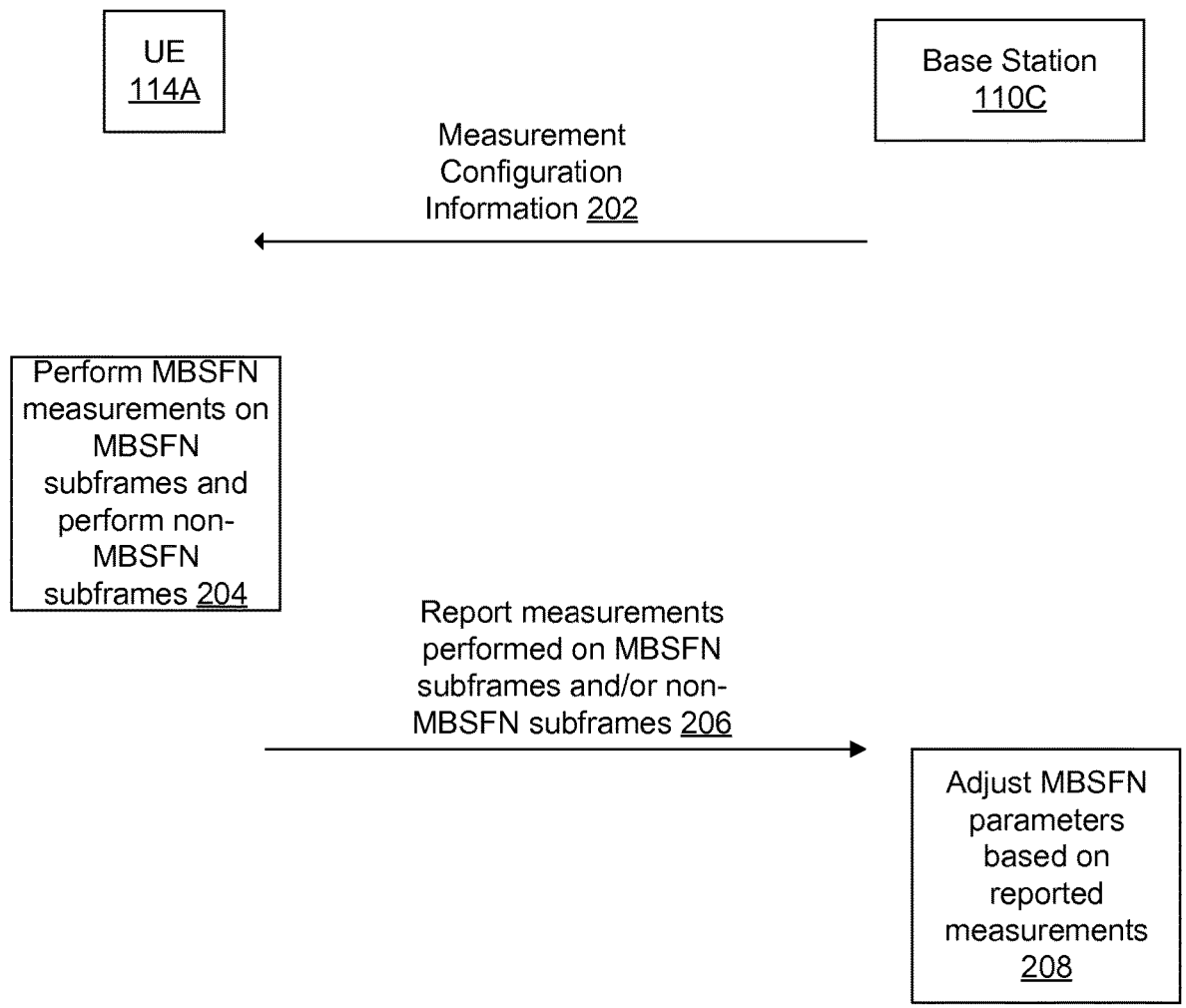
FIG. 2 depict an example of a process for multicast broadcast single-frequency network measurements, in accordance with some exemplary embodiments.

FIG. 2 depicts an example process 200 for measurements, in accordance with some example embodiments. The description of process 200 also refers to FIG. 1.

At 202, user equipment 114A may receive a measurement configuration (which may include a reporting configuration) for MBMS, in accordance with some example embodiments. For example, the measurement configuration may indicate a measurement configuration for MBSFN measurements performed on one or more MBMS subframes (for example, a measurement on one or more reference symbols, RS, of one or more MBMS subframes being decoded by the UE) and on one or more non-MBMS subframes (for example of CRS of a given cell). The configuration information may be provided using a common mechanism, such as the same messages or different messages as noted. Moreover, the configuration information may be provided by the network using for example, dedicated signaling, multicast signaling, broadcast signaling on SIB(s), although some or all of the measurement configuration may be fixed and/or specified in one or more standards. Further, the measurement configuration may be sent in response to an OAM and/or a MDT function, where a Trace function activates the MBSFN measurements and collects reported data.

At 204, UE 114A may perform one or more measurements in support of MBMS, in accordance with some example embodiments. For example, user equipment 114A may measure one or more MBSFN subframes and, in particular, measure the RS in one or more MBSFN subframes being decoded. These measurements may be used to determine RSSI, RSRQ, RSRP, and any other parameter. The user equipment may also perform block error rate (BLER) measurements from the MBMS subframes. Furthermore, UE 114A may measure one or more non-MBSFN subframes or cells. For example, UE 114A may measure the CRS signal associated with a non-MBMS cell or carrier. These non-MBMS measurements may also be used to determine RSSI, RSRQ, RSRP, and any other parameter.

At 206, the user equipment 114A may report measurements made on non-MBSFN cell/subframes and/or MBSFN subframes, in accordance with some example embodiments. Moreover, the measurement made at 204 may be reported separately or together. For example, the non-MBSFN cell/subframes may be reported per the configuration at 202 when the measurements are available and there is a connection to the network/base station 110C, when MBSFN subframes are not available.

At 208, the network may make one or more MBMS determinations based on information reported at 206. For example, the reported information from UE 114A as well as other UE may enable the network to make adjustments/modifications to an MBSFN deployment, an MBSFN MCS, and/or any other adjustment/modifications.

Figure 3:
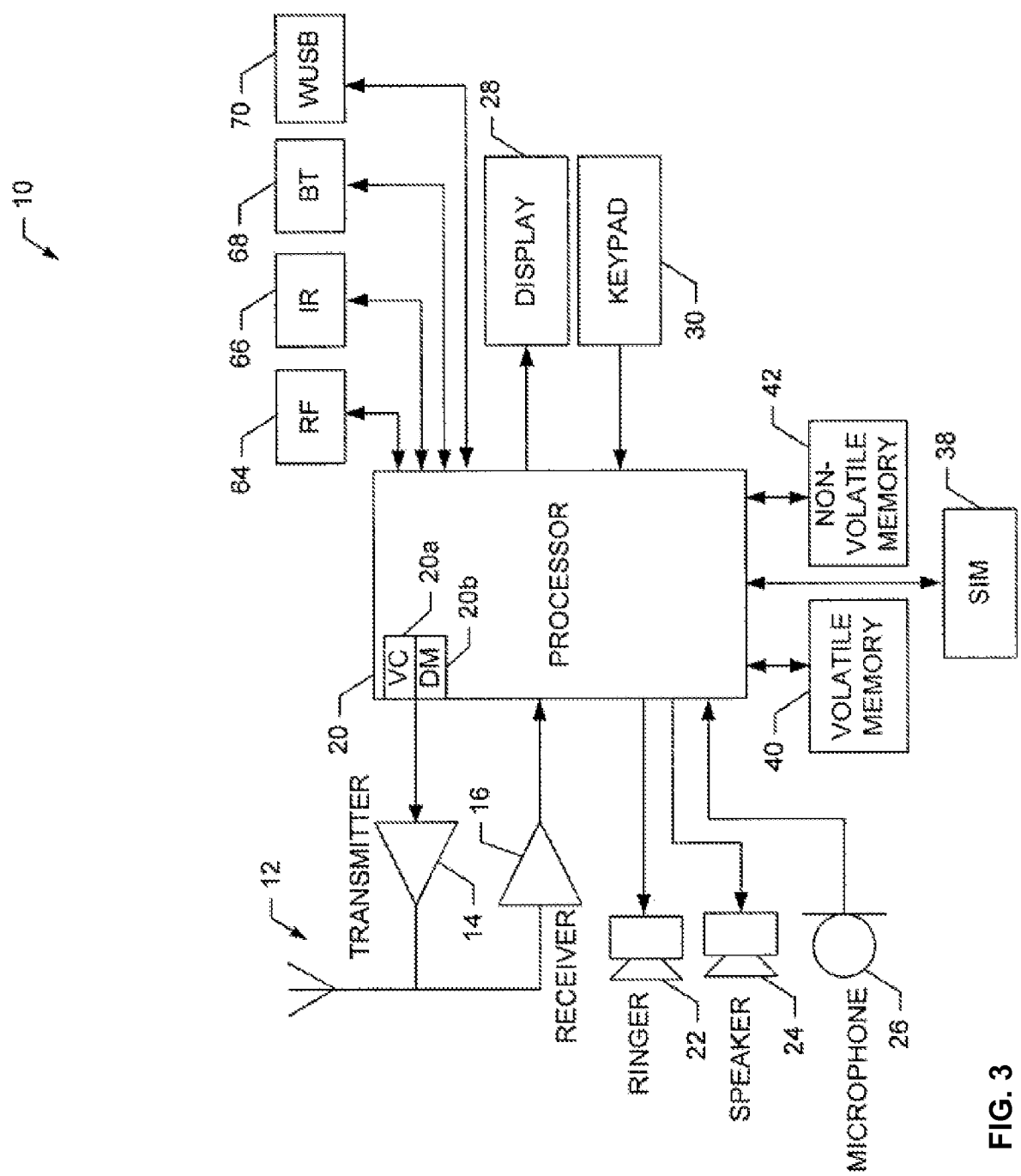
FIG. 3 depicts an example of a user equipment, in accordance with some exemplary embodiments.

FIG. 3 illustrates a block diagram of an apparatus 10, in accordance with some example embodiments. The apparatus 10 (or portions thereof) may be configured to provide a user equipment, a smart phone, a communicator, a machine type communication device, a wireless device, a wearable device, a cellular phone, a wireless sensor/device (for example, a wireless device which is part of a distributed architecture in for example, a car, a vehicle, a robot, a human, and/or the like).

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 3 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed. The apparatus may also be configured to support point-to-point links to a base station and MBSFN (via for example a multicast or broadcast from one or more base stations).

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 3, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations, such as process 200 and/or any other operations/functions disclosed herein. The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein with respect to process 200.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 3, computer-readable medium may comprise a non-transitory computer-readable storage medium that may be any media that can contain or store the instructions for use by or in connection with an instruction execution system, apparatus, or device, such as a computer.

Figure 4:
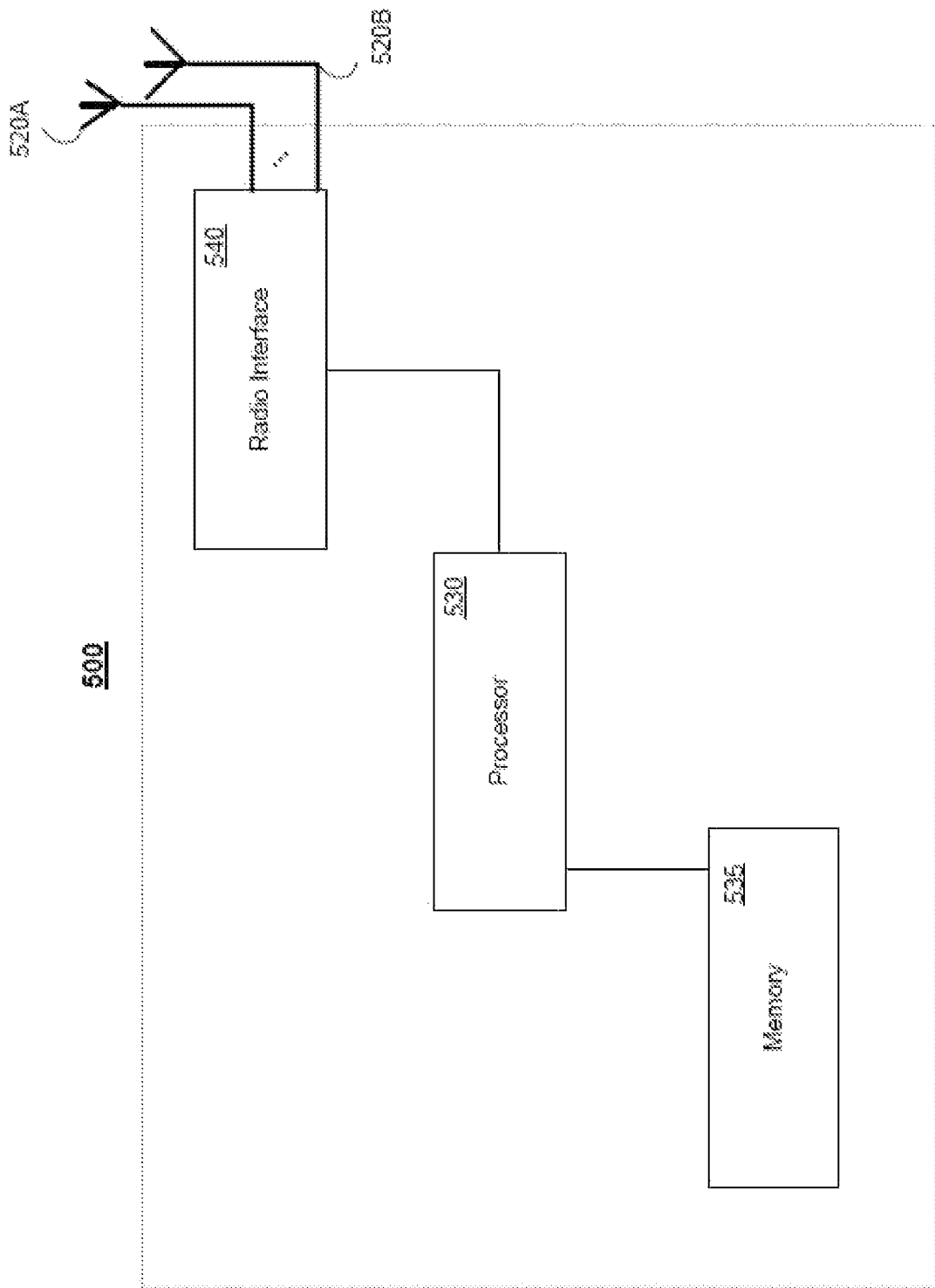
FIG. 4 depicts an example of a network node, such as a base station, in accordance with some exemplary embodiments.

FIG. 4 depicts an example implementation of a wireless access point 500, which may be implemented at for example base station 110A, B, and/or C in accordance with some example embodiments. The wireless access point may include one or more antennas 520 configured to transmit via downlinks and configured to receive uplinks via the antenna(s) 520. The wireless access point may further include a plurality of radio interfaces 540 coupled to the antenna(s) 520. The radio interfaces 540 may correspond to a plurality of radio access technologies including one or more of LTE, WLAN, Bluetooth, Bluetooth low energy, NFC, radio frequency identifier (RFID), ultrawideband (UWB), ZigBee, ANT, and the like. The radio interface 540 may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). The wireless access point may further include one or more processors, such as processor 530, for controlling the wireless access point 500 and for accessing and executing program code stored in memory 535. In some example embodiments, the memory 535 includes code, which when executed by at least one processor, causes one or more of the operations described herein with respect to the network at process 200 including for example receiving, by a user equipment, measurement configuration information indicative of at least a first measurement to be performed on a first subframe and a second measurement to be performed on a second subframe, wherein the first subframe is carried by a multicast broadcast subframe and the second subframe is carried by a non-multicast broadcast subframe; and performing one or more measurements in accordance with the received measurement configuration information.

Without in any way limiting the scope, interpretation, or application of the claims appearing below, a technical effect of one or more of the example embodiments disclosed herein is providing relevant information about MBSFN coverage even in the case the MBSFN data transmission is irregular.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. A method comprising:
   receiving, by a user equipment, measurement configuration information indicative of one or more first measurements to be performed on a first set of subframes and one or more second measurements to be performed on a second set of subframes, wherein the first set of subframes are associated with multicast broadcast mobile services and the second set of subframes are associated with non-multicast broadcast mobile services;
   performing one or more measurements in accordance with the received measurement configuration information; and
   reporting one or more first measurement results for the one or more first measurements supplemented with one or more second measurement results for the one or more second measurements, wherein the one or more second measurement results further include measurement results of one or more neighboring cells.

2. The method of claim 1, wherein one or more gaps in the one or more first measurement results are filled with the one or more second measurement results.

3. The method of claim 1, wherein the one or more first measurement results are reported along with the one or more second measurement results.

4. The method of claim 1, wherein the one or more first measurements are performed on multicast broadcast mobile services subframes.

5. The method of claim 1, wherein the one or more measurements are performed in an idle state or a connected state.

6. The method of claim 1, wherein a cell result is associated with a cell identification.

7. The method of claim 1, wherein the one or more second measurement results are reported for cells on a same frequency or cells on a different frequency as a multicast broadcast single frequency network carrier frequency.

8. An apparatus comprising:
at least one processor; and
at least one memory including computer program code, the at least one memory and the computer program code configured to, with the at least one processor, cause the apparatus to perform at least the following:
receive, by the apparatus, measurement configuration information indicative of one or more first measurements to be performed on a first set of subframes and one or more second measurements to be performed on a second set of subframes, wherein the first set of subframes are associated with multicast broadcast mobile services and the second set of subframes are associated with non-multicast broadcast mobile services;
perform one or more measurements in accordance with the received measurement configuration information; and
report one or more first measurement results for the one or more first measurements supplemented with one or more second measurement results for the one or more second measurements, wherein the one or more second measurement results further include measurement results of one or more neighboring cells.

9. The apparatus of claim 8, wherein the one or more first measurement results are non-continuous.

10. The apparatus of claim 8, wherein one or more gaps in the one or more first measurement results are filled with the one or more second measurement results.

11. The apparatus of claim 8, wherein the one or more first measurement results are reported along with the one or more second measurement results.

12. The apparatus of claim 8, wherein the one or more first measurements are performed on multicast broadcast mobile services subframes.

13. The apparatus of claim 8, wherein the one or more measurements are performed in an idle state or a connected state.

14. The apparatus of claim 8, wherein a cell result is associated with a cell identification.

15. The apparatus of claim 8, wherein the one or more second measurement results are reported for cells on a same frequency or for cells on a different frequency as a multicast broadcast single frequency network carrier frequency.

16. A method comprising:
sending, by a network node, measurement configuration information indicative of one or more first measurements to be performed on a first set of subframes and one or more second measurements to be performed on a second set of subframes, wherein the first set of subframes are associated with multicast broadcast mobile services and the second set of subframes are associated with non-multicast broadcast mobile services; and
receiving, in response to the measurement configuration information, one or more reports including one or more first measurement results for the one or more first measurements supplemented with one or more second measurement results for the one or more second measurements, wherein the one or more second measurement results further include measurement results of one or more neighboring cells.

17. The method of claim 16, wherein the one or more first measurement results are reported along with the one or more second measurement results.

18. The method of claim 16 further comprising:
adjusting, based on received one or more reports, at least a modulation and coding scheme for a multicast broadcast single frequency network.

19. An apparatus comprising:
at least one processor; and
at least one memory including computer program code, the at least one memory and the computer program code configured to, with the at least one processor, cause the apparatus to perform at least the following:
send, by the apparatus, measurement configuration information indicative of one or more first measurements to be performed on a first set of subframes and one or more second measurements to be performed on a second set of subframes, wherein the first set of subframes are associated with multicast broadcast mobile services and the second set of subframes are associated with non-multicast broadcast mobile services; and
receive, in response to the measurement configuration information, one or more reports including one or more first measurement results for the one or more first measurements supplemented with one or more second measurement results for the one or more second measurements, wherein the one or more second measurement results further include measurement results of one or more neighboring cells.

20. The apparatus of claim 19, wherein the one or more first measurement results are reported along with the one or more second measurement results.

21. The apparatus of claim 19, wherein the one or more first measurements are performed on multicast broadcast mobile services subframes.

22. The apparatus of claim 19, wherein the one or more second measurements are performed for radio resource management purposes.

23. The apparatus of claim 19, wherein the apparatus is further configured to at least adjust, based on received one or more reports, at least a modulation and coding scheme for a multicast broadcast single frequency network.

* * * * *